(12) United States Patent
Chen et al.

(10) Patent No.: US 7,689,132 B2
(45) Date of Patent: Mar. 30, 2010

(54) INTERFERENCE-REJECTION CODING METHOD FOR AN OPTICAL WIRELESS COMMUNICATION SYSTEM AND THE OPTICAL WIRELESS COMMUNICATION SYSTEM THEREOF

(75) Inventors: Yuan Chen, Hsinchu (TW);
Shang-Feng Tsai, Hsinchu (TW);
Yung-Hua Hung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 946 days.

(21) Appl. No.: 11/146,546

(22) Filed: Jun. 7, 2005

(65) Prior Publication Data

US 2006/0275039 A1 Dec. 7, 2006

(51) Int. Cl.
*H04B 10/00* (2006.01)

(52) U.S. Cl. .................. 398/189; 398/187; 398/190; 398/191; 398/197; 398/149

(58) Field of Classification Search ............. 398/127, 398/202–214
See application file for complete search history.

(56) References Cited

U.S. PATENT DOCUMENTS

| | | | | |
|---|---|---|---|---|
| 4,027,335 A | * | 5/1977 | Miller ............................ 360/40 |
| 4,523,181 A | * | 6/1985 | Tazaki et al. ................... 341/58 |
| 4,612,653 A | * | 9/1986 | Livingston et al. ........... 375/239 |
| 4,623,886 A | * | 11/1986 | Livingston .................... 370/462 |
| 5,390,195 A | * | 2/1995 | Brush ........................... 714/778 |
| 5,513,029 A | * | 4/1996 | Roberts ......................... 398/32 |
| 5,600,471 A | * | 2/1997 | Hirohashi et al. ............. 398/136 |
| 5,680,418 A | * | 10/1997 | Croft et al. .................... 375/346 |
| 5,706,115 A | * | 1/1998 | Hirayama et al. ............ 398/130 |
| 5,742,357 A | * | 4/1998 | Griesbaum ................... 348/731 |
| 5,896,211 A | * | 4/1999 | Watanabe ...................... 398/76 |
| 5,926,301 A | * | 7/1999 | Hirt .............................. 398/185 |
| 6,118,567 A | * | 9/2000 | Alameh et al. ............... 398/191 |
| 6,141,357 A | * | 10/2000 | Testani et al. ................ 370/507 |
| 6,204,956 B1 | * | 3/2001 | Cisternino et al. ........... 359/328 |
| 6,278,537 B1 | * | 8/2001 | Miyamori ..................... 398/119 |
| 6,341,023 B1 | * | 1/2002 | Puc ............................... 398/79 |
| 6,452,706 B1 | * | 9/2002 | Iida et al. ...................... 398/158 |
| 6,556,617 B1 | * | 4/2003 | Tsujimoto .................... 375/141 |
| 6,721,510 B2 | * | 4/2004 | Graves et al. ................ 398/129 |
| 6,763,057 B1 | * | 7/2004 | Fullerton et al. ............. 375/141 |
| 7,062,176 B2 | * | 6/2006 | Liu et al. ...................... 398/159 |
| 7,133,621 B1 | * | 11/2006 | An ............................... 398/185 |
| 7,133,622 B2 | * | 11/2006 | Winzer ......................... 398/188 |

(Continued)

OTHER PUBLICATIONS

Al-Bassam, "Design of Efficient Balanced Codes", Mar. 1994, IEEE Transactions on comptuers, vol. 43, No. 3.*

(Continued)

*Primary Examiner*—Ken N Vanderpuye
*Assistant Examiner*—Danny W Leung

(57) ABSTRACT

An interference-rejection coding method for an optical wireless communication system and such an optical wireless communication system are provided. The coding method uses delay modulation, block code techniques and filtering to reduce the low frequency interference from light sources. A plurality of codewords from the block codes are reserved for performing digital data recovery. The invention removes the need of analog clock data recovery circuit, and does not require complex hardware for realization. Therefore, it can be applied to a wide range of applications, such as optical WLAN, data transmission of medical facilities, wireless communication in the aircraft, encrypted data transmission network, and low-priced transmission interfaces.

6 Claims, 7 Drawing Sheets

U.S. PATENT DOCUMENTS

| | | | | |
|---|---|---|---|---|
| 7,142,621 | B2* | 11/2006 | Vallet et al. | 375/355 |
| 7,230,985 | B2* | 6/2007 | Park et al. | 375/233 |
| 7,230,995 | B2* | 6/2007 | Wengerter et al. | 375/295 |
| 7,254,598 | B2* | 8/2007 | Yomo et al. | 708/319 |
| 7,277,644 | B2* | 10/2007 | Johnson et al. | 398/158 |
| 7,292,793 | B2* | 11/2007 | Bergano | 398/183 |
| 7,302,192 | B2* | 11/2007 | Elahmadi et al. | 398/190 |
| 7,308,205 | B2* | 12/2007 | Ozeki et al. | 398/164 |
| 7,324,713 | B2* | 1/2008 | Jang et al. | 385/1 |
| 7,340,168 | B2* | 3/2008 | Giles et al. | 398/47 |
| 7,346,138 | B2* | 3/2008 | Fazel et al. | 375/354 |
| 7,389,051 | B2* | 6/2008 | Morioka et al. | 398/127 |
| 7,536,111 | B1* | 5/2009 | An | 398/183 |
| 2002/0149824 | A1* | 10/2002 | Beaulieu et al. | 359/158 |
| 2005/0047793 | A1* | 3/2005 | Butler et al. | 398/149 |
| 2006/0171722 | A1* | 8/2006 | Toliver | 398/188 |
| 2006/0275039 | A1* | 12/2006 | Chen et al. | 398/140 |
| 2007/0286318 | A1* | 12/2007 | Imahashi et al. | 375/355 |
| 2008/0049780 | A1* | 2/2008 | Whitehead | 370/463 |
| 2008/0101795 | A1* | 5/2008 | Schulz et al. | 398/25 |

OTHER PUBLICATIONS

A.J.C. Moreira, R.T. Valadas, and A.M. de Oliveria Duarte, "Characterisation and Modelling of Artificial Light Interference in Optical Wireless Communication Systems," IEEE vol. 1, pp. 326-331, 1995.

K. Samaras, A.M. Street, D.C. O'Brien, and D.J. Edwards, "Error Rate Evaluation of Wireless Infrared Links," Communications, IEEE vol. 2, pp. 826-831, 1998.

J.B. Carruthers and J.M. Kahn, "Multiple-Subcarrier Modulation for Nondirected Wireless Infrared Communication," IEEE vol. 14, Issue: 3, pp. 538-546, 1996.

R. You and J.M. Kahn, "Average Power Reduction Techniques for Multiple-Subcarrier Intensity-Modulated Optical Signals," IEEE vol. 49, Issue: 12, pp. 2164-2171, 2001.

S.L. Dhomeja, T.B. Oon, and R. Steele, "Performance of Non-Directed Infrared CDMA," IEEE 1998, vol. 1, 5-9, pp. 453-457, 1998.

M. Abtahi and J.A. Salehi, "Indoor Wireless Infrared Communications Based on Spread-Space Holographic CDMA," IEEE vol. 2, 18-21, pp. 944-948, Sep. 2000.

S. Zahedi, J.A. Salehi, and M. Nasiri-Kenari, "M-Ary infrared CDMA for indoors wireless communications," IEEE vol. 2, 30, pp. E-6-E-10, 2001.

R. Matsuo, T. Ohtsuki, and I. Sasase, "Performance Analysis of Indoor Infrared Wireless Systems Using PPM CDMA with Linealizer with Dead-Zone and PPM CDMA with Hard-Limitor on Diffuse Channels," IEEE vol. 7, 11-14, pp. 2016-2020, Jun. 2001.

A.J.C. Moreira, R.T. Valadas, and A.M. de Oliveria Duarte, "Reducing the Effects of Ambient Light Interference in Wireless Infrared Transmission Systems," IEE, pp. 5/1-5/10, 1996.

K.L. Sterckx, J.M.H. Elmirghani, and R.A. Cryan, "On the Use of Adaptive Threshold Detection in Optical Wireless Communication Systems," IEEE vol. 2, pp. 1242-1246, 2000.

* cited by examiner

FIG. 5

INTERFERENCE-REJECTION CODING METHOD FOR AN OPTICAL WIRELESS COMMUNICATION SYSTEM AND THE OPTICAL WIRELESS COMMUNICATION SYSTEM THEREOF

FIELD OF THE INVENTION

The present invention generally relates to a coding scheme for optical wireless communication systems, and more specifically to an interference-rejection coding method for an optical wireless communication system and the optical wireless communication system thereof.

BACKGROUND OF THE INVENTION

As the wireless local area network (WLAN) becomes ubiquitous, the users of portable devices can easily find access points to surf the internet and obtain the information without the restriction imposed by the conventional wiring cables. However, the electromagnetic wave (EM wave) emitted from the wireless communication is potentially harmful to the health, and can also interfere with other electronic instruments. Therefore, its use is usually restricted in the environment where sensitive electronic devices are widely used, such as in a hospital or an aircraft. In addition, because wireless electronic networks are susceptible to eavesdropping or interception, they are unsuitable for applications such as military, government or financial institutes where data security is highly regarded. On the other hand, wireless optical communication provides the alternative to avoid the disadvantages of using electronic wireless communication, including health, security and interference of EM waves. Furthermore, optical wireless communication is not regulated by the government in terms of frequency spectrum management; hence, optical wireless communication provides great potential for a wider range of applications.

Conventional optical wireless communication systems use optical filters, such as low-pass or band-pass filters, to filter out light of different wavelength. Then, an electronic high-pass filter is used to filter out the low frequency harmonic interference. FIG. 1 shows the harmonic interference from various artificial light sources. Although the use of high-pass filter can achieve the suppression of interferences, the cut-off frequency of the electronic high-pass filter must be raised in order to filter out the interferences entirely. This, however, may lead to the distortion of the signals, and generating the additional inter-symbol interference (ISI) effect. Therefore, in conventional technologies, the cut-off frequency of the high-pass filter must be designed to optimize the balance between the increases of ISI and the interference suppression. But the conventional methods can only provide 0.2 dB of improvement in filtering the interference of fluorescent light. The unfiltered fluorescent interference still creates a loss of 17 dB or more, and is unable to reject the interference entirely. The currently available solutions for this include sub-carrier modulation, line coding techniques, spread spectrum modulation, differential detection and adaptive threshold detection techniques.

Conventional sub-carrier modulation techniques are used in optical wireless communication. The signals are modulated to higher frequency range to avoid the overlapping of signal frequency spectrum with interfering optical spectrum. Then, an electronic high-pass filter can be used to effectively filter the interfering source. However, these techniques require additional modulation and demodulation mechanisms, and the system complexity is increased.

Line coding techniques are similar to the sub-carrier modulation techniques, except that these techniques add line coding to modulate the signal to the higher frequency to avoid the interference. For example, U.S. Pat. No. 5,600,471/1997, by JVC, disclosed an optical wireless data transmitting and receiving apparatus using a Manchester line coding to reject interference, and U.S. Pat. No. 5,706,115/1996 disclosed a method of using differential mode inversion (DMI) line coding for interference rejection in an optical wireless communication system. Although these techniques are simple, the disadvantages including the bandwidth requirement twice of that of conventional non return to zero (NRZ), the increasing received optical noise, transmission distortion, and higher demands on the optical components. FIG. 2 shows a waveform view of various line coding techniques, including NRZ, Manchester, DMI and delay modulation.

The spread spectrum modulation techniques use spread spectrum to disperse the base frequencies in order to reduce the impact on the signal. These techniques greatly increase the system complexity, transmission bandwidth requirement and impose higher demands on optical components. Most of the researches in this area are academic, and few are applied to industrial use.

The different detection techniques, originally proposed by U.C. Berkeley, use two optical receivers, with one of them passing through an optical filter and the other passing through a tunable attenuator. The interference-free signal can be extracted by the difference between two signals. The disadvantages of these techniques include the complexity of front-end circuitry and the uncertainty of interference improvement dependent on interference characteristics.

The adaptive threshold detection techniques change the detection threshold at the receiving end according to the condition of the received signal. These techniques can improve the change of the signal bias, but are less effective for optical interference and these techniques increase the front-end circuitry complexity.

In summary of the aforementioned analysis, most optical wireless communication interference-rejection techniques focus on modulation and analog front-end processing. The line coding techniques, in comparison, exhibit a better performance in interference-rejection while only slightly increase system complexity. Therefore, if the bandwidth requirement problem can be solved, the line coding techniques can be more effectively applied to optical wireless communication systems.

As the general health concern, wireless optical communication has a restrictive standard (ILC-825-1) on transmission power. This, combined with the high propagation attenuation (20-40 dB) of the air, greatly limits the power of the signals received at the receiving end. In addition, the indoor light sources, such as sun rays, fluorescent light, lamps, infra-red remote controllers, all contribute to the optical interference in the optical wireless communication. As the interference severely degrades the S/N ratio at the receiving end, it is imperative to solve the problem of optical interference.

SUMMARY OF THE INVENTION

The present invention has been made to overcome the aforementioned drawback of the conventional optical wireless communication systems. The primary object of the present invention is to provide an interference-rejection coding method for optical wireless communication systems.

Another object of the present invention is to provide such an optical wireless communication system that can use only low-complexity hardware to effectively and stably reject the optical interference.

To achieve the aforementioned objects, the present invention uses the delay modulation together with block code to modulate the data signals to a high frequency range, and then uses a narrow-band band-pass filter to reject the optical interference. The transmitting end and the receiving end are added with corresponding modulation and demodulation structures, respectively. Hence, the receiving end can correctly demodulate the modulated signals transmitted by the transmitting end.

The interference-rejection coding scheme of the present invention can be applied to optical WLAN, data transmission of medical facilities, wireless communication in the aircraft, and encrypted data transmission network. As the present invention uses digital modulation and filtering, the present invention can also be used with digital data recovery to greatly reduce the demands on the specification and the cost of analog front-end. Therefore, the present invention can also be used in low-priced transmission interfaces.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 5 shows an example of a block code table with 8B/10B.

DETAILED DESCRIPTION OF THE PREFERRED EMBODIMENTS

Figure 1:
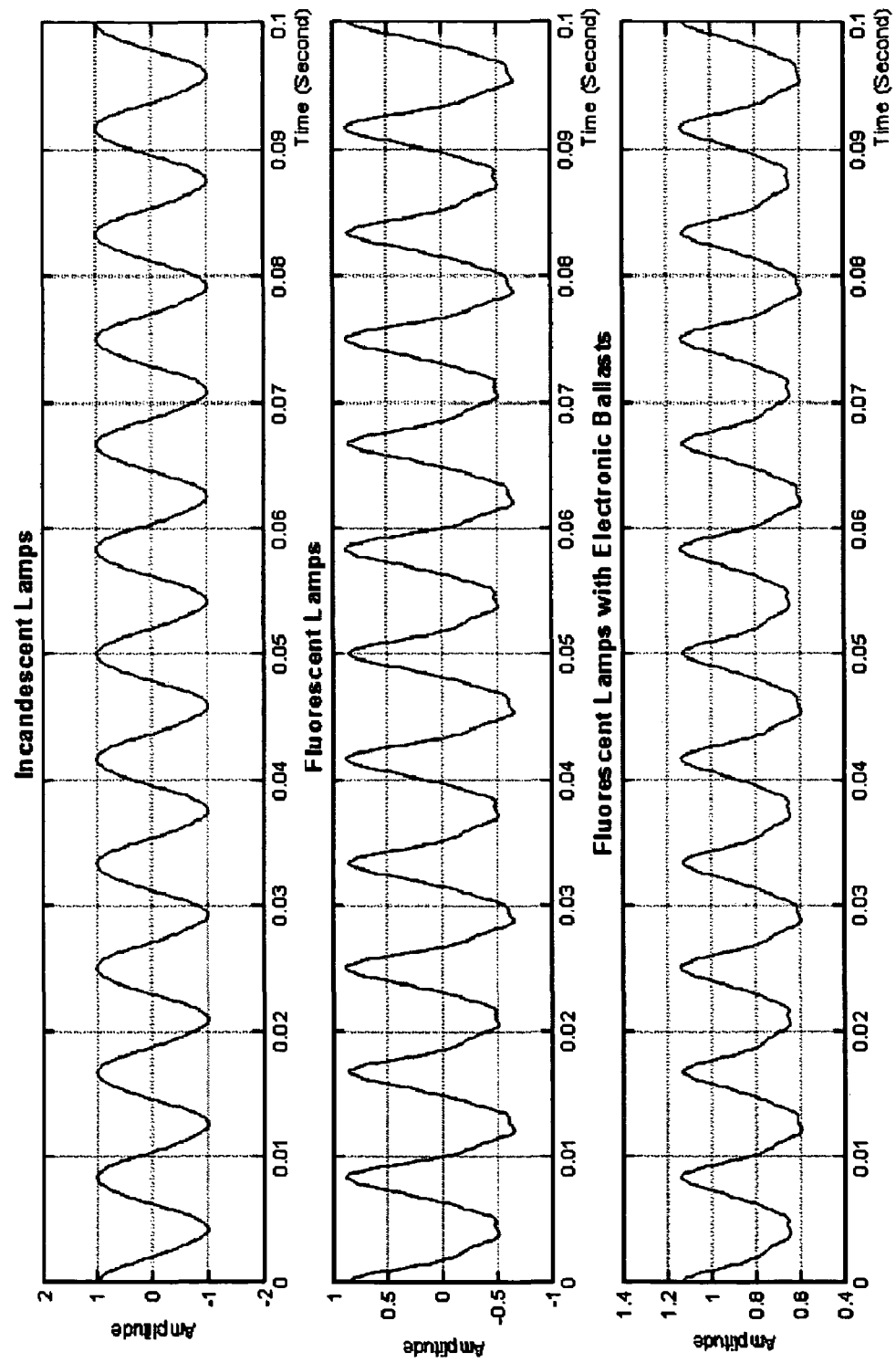
FIG. 1 shows a waveform view of the harmonic interference of various artificial light sources.
Figure 2:
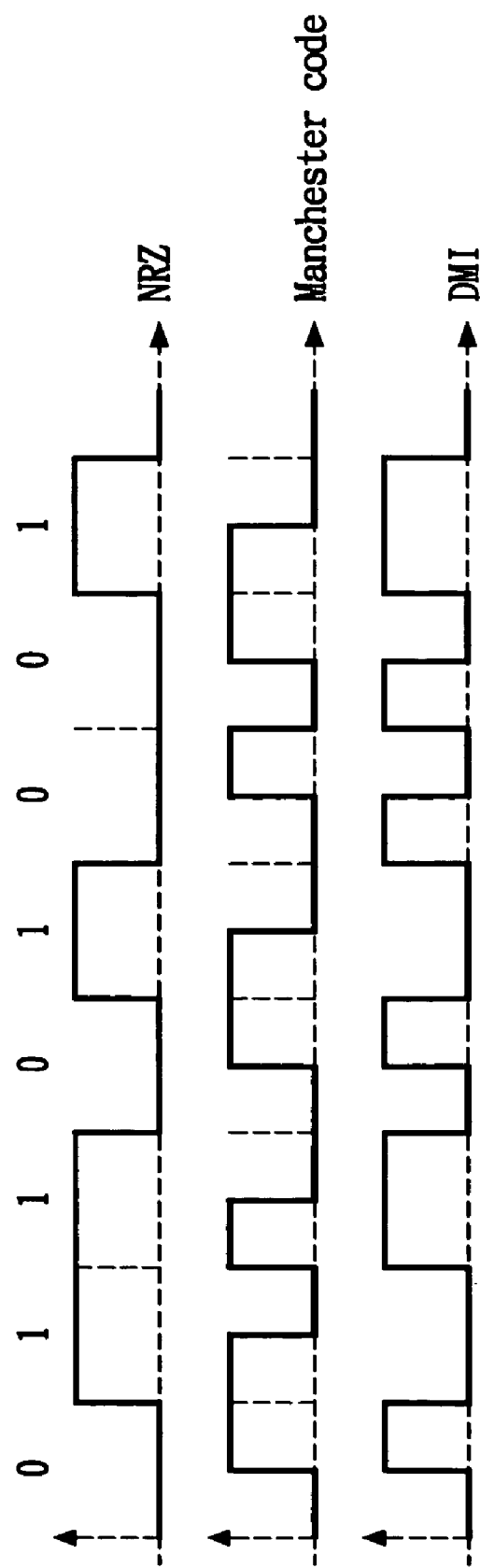
FIG. 2 shows a waveform view of various line coding schemes, including NRZ, Manchester, DMI, and delay modulation.
Figure 3:
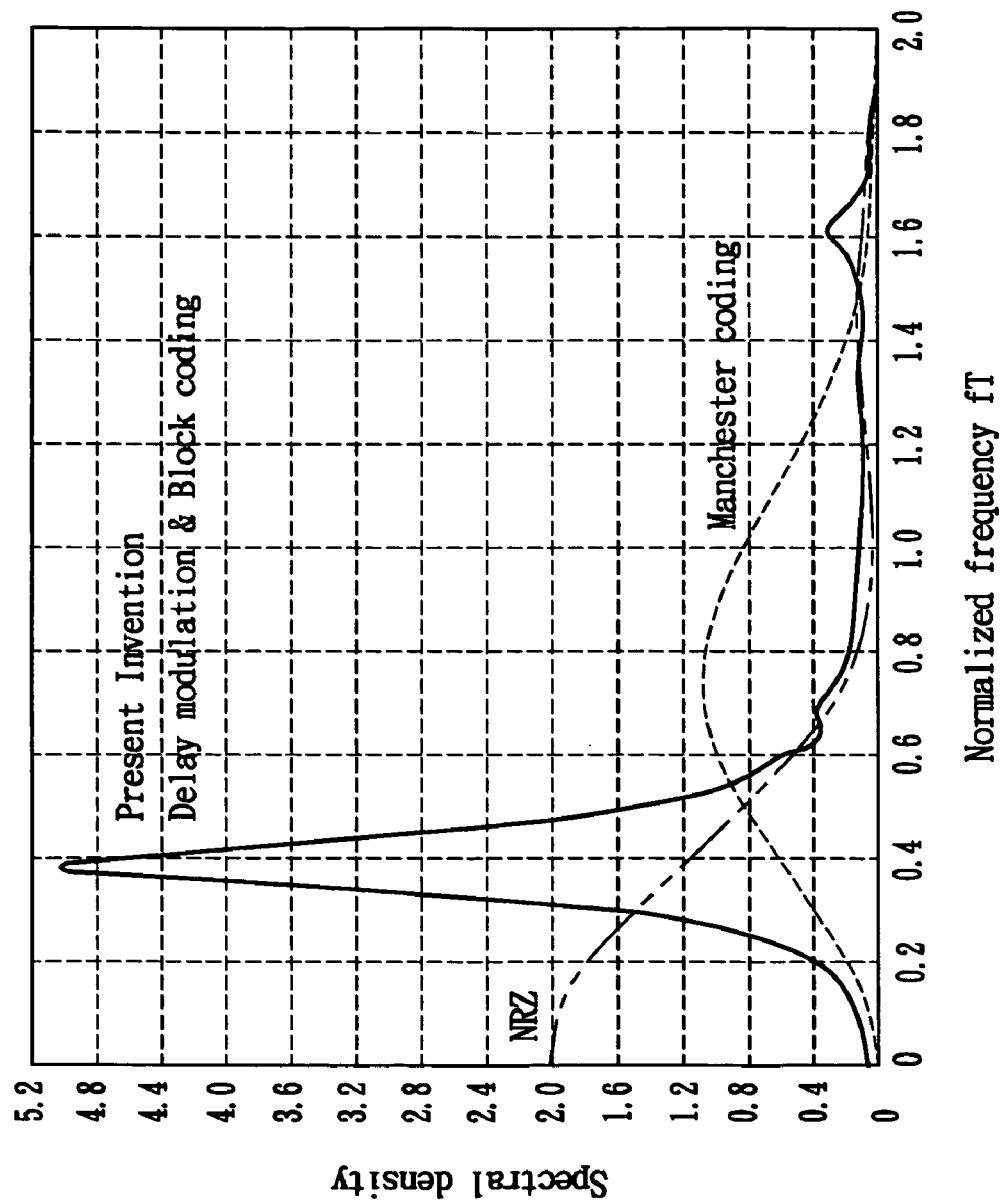
FIG. 3 shows the signal frequency spectrum characteristics of various line coding schemes and the present invention.

The present invention uses the delay modulation together with block code to modulate the signal to high frequency, and then uses a narrow-band band-pass filter to reject the low-pass interference. FIG. 3 shows the signal frequency spectrum characteristics of various line coding schemes and the present invention. As shown in FIG. 3, the required bandwidth for the signal using delay modulation with block code of the present invention is less than that of other line coding techniques, such as Manchester or NRZ. This invention includes cascade coding and filtering and is applicable to wireless, medical or encrypted communication systems or environments.

At the transmitting end and the receiving end, the present invention arranges a pair of corresponding modulation and demodulation modules, respectively. Thereby, the receiving end may correctly decode the signals coded by the transmitted end. The present invention also uses delay modulation to concentrate the power of the optical signal, modulate the signal into a high frequency range, and reduce the transmission bandwidth. A block code encoder is added before the delay modulation to enhance the capability of interference-rejection, by a way of increasing redundancy to enforce the coded signal into a high frequency range.

Embodiments of the interference-rejection method for an optical wireless communication system and the optical wireless communication system having an optical receiver and an optical transmitter will be described in the following, referring to the drawings.

Figure 4:
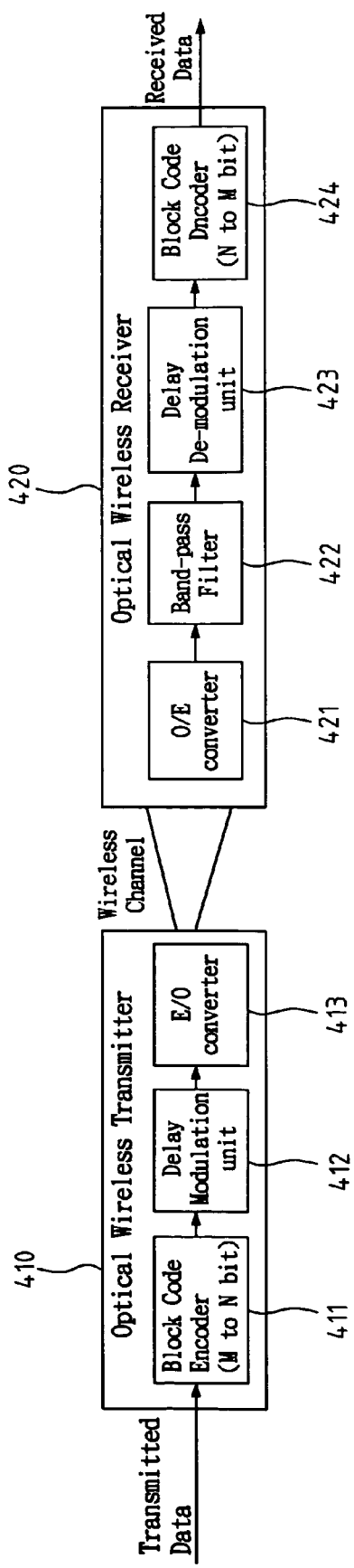
FIG. 4 shows a block diagram of an embodiment of the optical wireless communication system according to the present invention.

FIG. 4 shows a block diagram of an embodiment of the optical wireless communication system according to the present invention. Referring to FIG. 4, the optical wireless communication system comprises an optical wireless transmitter 410 and an optical wireless receiver 420. The optical wireless transmitter 410 further includes a block code encoder (M to N bit) 411, a delay modulation unit 412, and an electrical-to-optical (E/O) converter 413. The optical wireless receiver 420 further includes an optical-to-electrical (O/E) converter 421, a band-pass filter 422, a delay demodulation unit 423, and a block code decoder (N to M bit) 424.

At the transmitting end, the data for transmission are sent to block code encoder (M to N bit) 411. The block code encoder 411 transforms an M-bit data into an N-bit output, where M<N. The purpose of using a block code encoder is to make the numbers of the binary bits 0 and 1 passing through delay modulation unit 412 equal. After the encoding performed by block code encoder 411 and delay modulation unit 412, the resulted electrical data signal is then fed into E/O converter 413. The E/O converter 413 converts the electrical data signal into an optical signal for transmission through wireless channel.

At the receiving end, the optical signal received by optical wireless receiver 420 is first converted back to an electrical data signal by the O/E converter 421. The electrical data signal converted is filtered by band-pass filter 422 to filter out low frequency optical interference, and then fed into delay demodulation unit 423 for demodulation. The block code decoder 424 decodes the demodulated optical data signal to thereby obtain a corresponding original data signal.

As described earlier, delay modulation unit 412, using a line coding technique with memory, can concentrate the power of the optical data signal and move the data signal to a high frequency range, while reducing the transmission bandwidth. In addition, block code encoder 411 utilizes redundancy to move the data signal further into a high frequency range to reject low frequency interference. These methods can effectively move the optical data signals to a high frequency range, and thus avoids the low frequency interference from the artificial light sources. Therefore, low frequency interference can be filtered without the distortion of the optical data signal.

Furthermore, as shown in FIG. 3, the bandwidth is less than those of Manchester or NRZ techniques. Therefore, a narrow-band band-pass filter can be used in order to reduce the power of the optical noises in the received data signals and increase the signal-to-noise (S/N) ratio.

Figure 5:
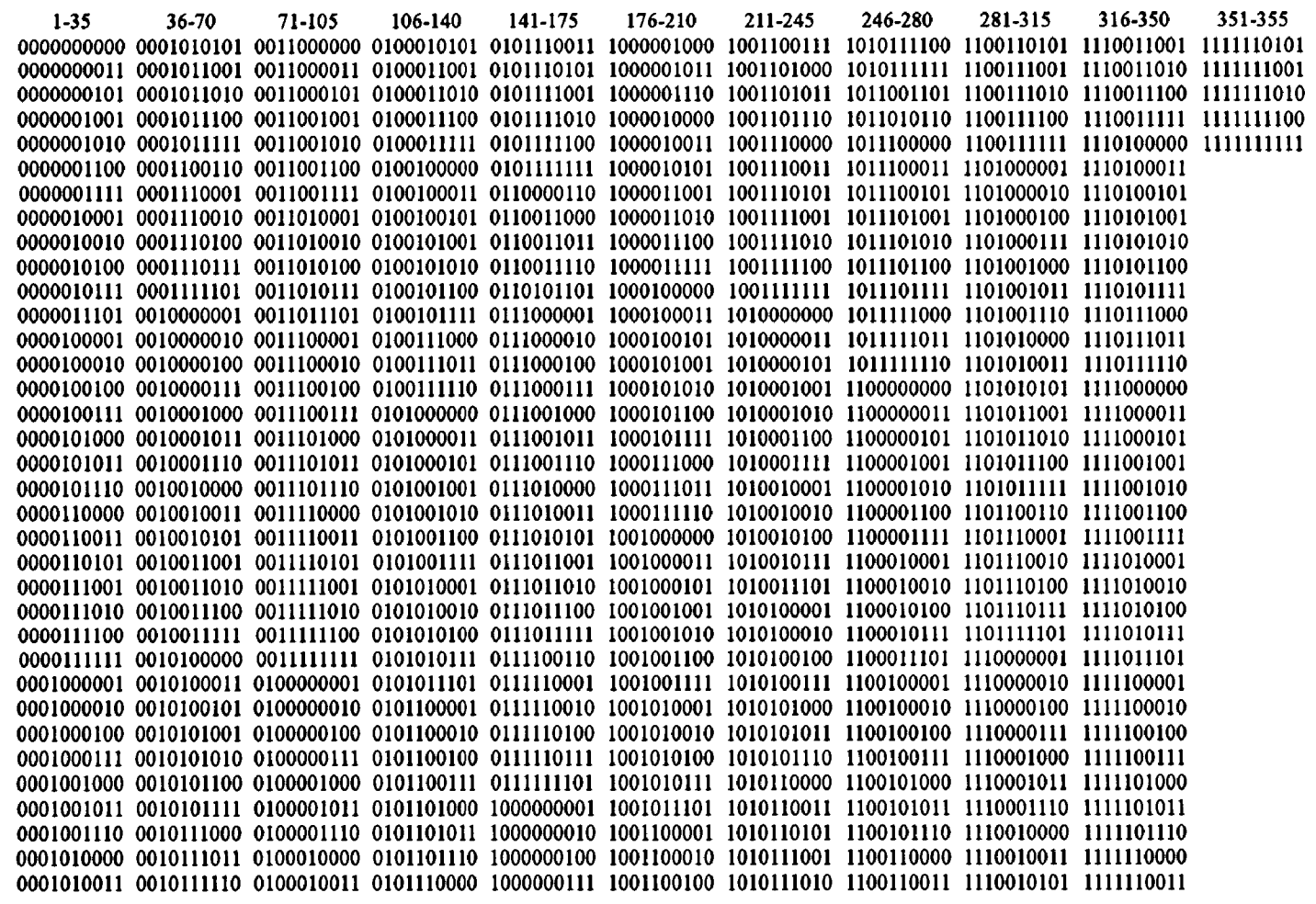

FIG. 5 shows an example of a block code table of M=8, and N=10 (8B/10B). As shown in FIG. 5, 355 10-bit data signals can be found so that they will have the equal number of 1s and 0s after passing delay modulation unit 412. As each transmitted data signal is 8-bit long, 256 out of 355 codeword sets can be used for data transmission, and the remaining 99 10-bit codeword sets can be used for controlling or transmitting messages.

Figure 6:
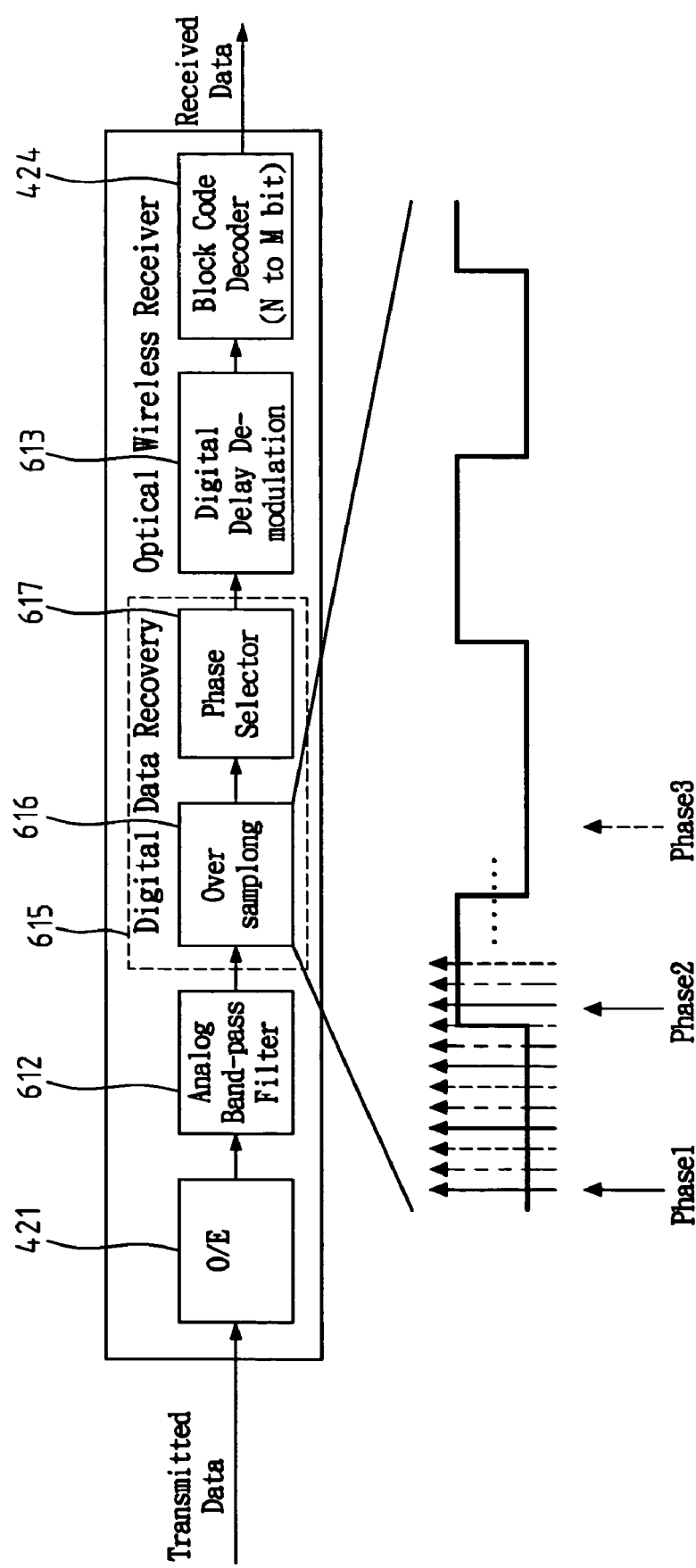
FIG. 6 shows a block diagram of another embodiment of the optical wireless communication system according to the present invention.

FIG. 6 shows a block diagram of another embodiment of the present invention, where an optical wireless receiver further includes a digital data recovery module. The digital data recovery module utilizes control codewords to perform digital data recovery. As shown in FIG. 6, digital data recovery module 610 is placed between an analog band-pass filter 612 and a digital delay demodulation unit 613. Digital data recovery module 615 further includes an over-sampling unit 616 and a phase selector 617. The filtered signal is fed to digital data recovery module 615 to obtain digital signal, 0 or 1. Over-sampling unit 616 samples $N_f$ times ($N_f \geq 2$) in each half of delay modulation symbol. The data from over-sampling unit 616 is sent to phase selector 617 for selecting the correct phase (one out of $N_f$). Because the control codeword has particular patterns that are different from data codeword, such as 110011001100110011001100. Therefore, only the phases that match the control codes will be selected. After a certain period of time, the control codeword to be transmitted will be repeated. By this manner, the receiving end can perform data recovery and select correct phase to avoid the errors caused by the drift of system clock frequency.

Figure 7:
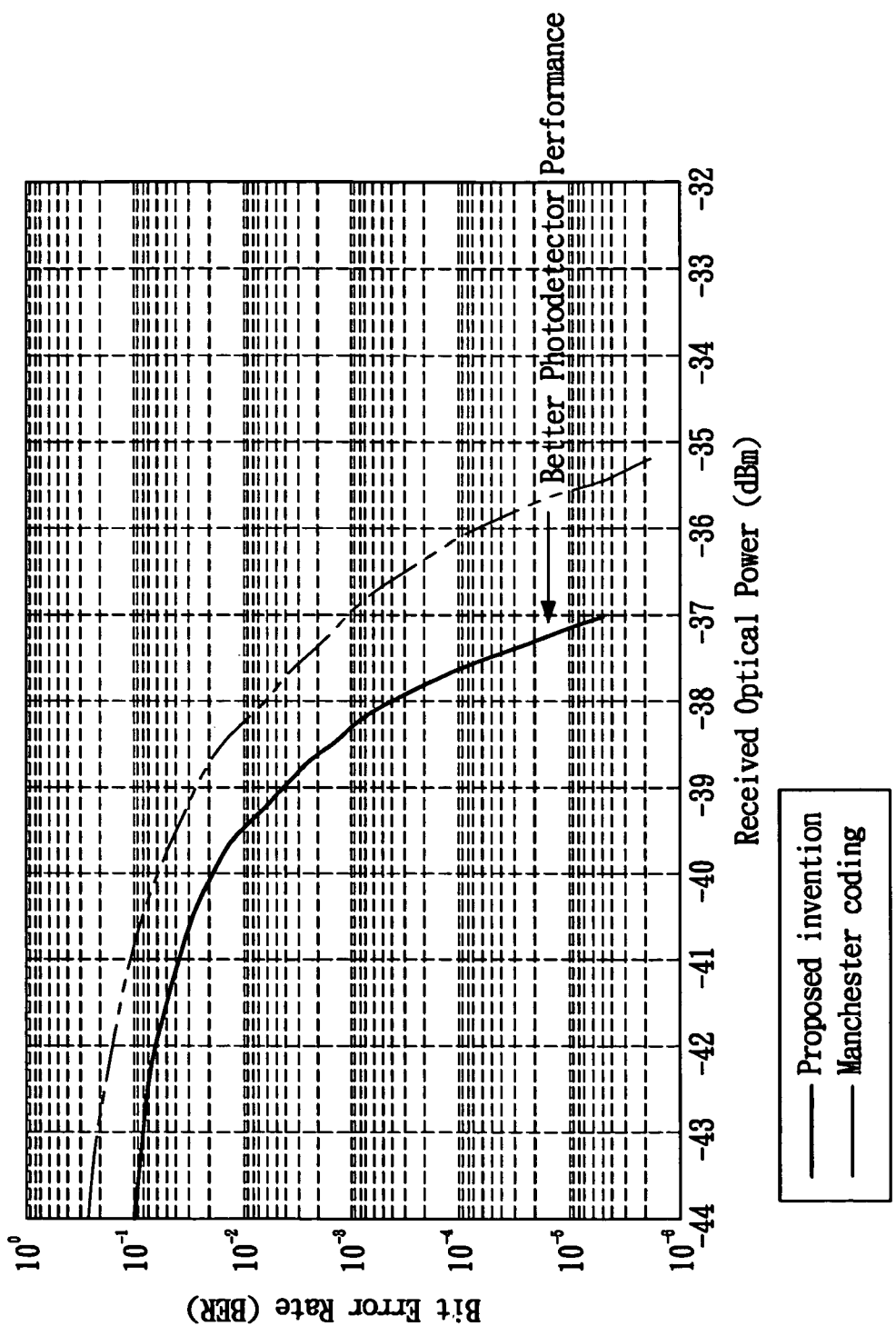
FIG. 7 shows an error bit rate comparison between Manchester coding scheme and the present invention.

FIG. 7 shows an error bit rate comparison between Manchester coding scheme and the present invention. As shown in FIG. 7, the present invention has a less error bit rate than that of Manchester coding scheme. In other words, the present invention achieves a better photodetector performance.

The complexity resulted from the interference-rejection coding scheme of the present invention is only in the base frequency signal processing, and does not raise the demand in optical components and front-end circuitry. Therefore, the present invention can be easily realized by the ordinary hardware components.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An interference-rejection coding method for being used in an optical wireless communication system having an optical wireless transmitter and an optical wireless receiver, said method comprising the steps of:
 (a) encoding a data signal for transmission using a block code encoder with a block code and generating an encoded block code;
 (b) delay modulating said encoded block code into a modulated code using a delay modulation unit of delay modulation technique;
 (c) converting said modulated code into an optical data signal for transmission;
 (d) converting said optical data signal back to an electrical data signal;
 (e) filtering out low frequency interferences in said electrical data signal to generate a filtered signal;
 (f) over-sampling said filtered signal at the receiver's end to generate a sampled signal, and selecting correct phase from said sampled signal to form a recovered data signal;
 (g) delay demodulating said recovered data signal into a demodulated data signal using a demodulator of delay modulation technique; and
 (h) decoding said demodulated data signal, thereby to obtain a corresponding original data signal;
 wherein said block code encoder makes the number of bits 0 and 1 passing through said delay modulation unit equal.

2. The interference-rejection coding method as claimed in claim 1, wherein said transmitter reserves a plurality of codewords of said block code for controlling or transmitting messages.

3. The interference-rejection coding method as claimed in claim 2, wherein said receiver uses said codewords for phase selection to achieve said digital data recovery.

4. An optical wireless communication system, comprising an optical wireless transmitter and an optical wireless receiver, said optical wireless transmitter further comprising:
 a block code encoder for encoding a data signal for transmission with a block code and generating an encoded block code;
 a delay modulation unit for modulating said encoded block code into a modulated electrical data signal; and
 an electrical-to-optical converter for converting said modulated electrical data signal into an optical data signal for transmission through a wireless channel;
 and said optical wireless receiver further comprising:
 an optical-to-electrical converter and receiver for receiving and converting said optical data signal into an electrical data signal;
 a band-pass filter for filtering out low frequency interferences in said electrical signal to generate a filtered signal;
 a delay demodulator for demodulating said filtered signal into a demodulated data signal; and
 a block code decoder for decoding said demodulated data signal to thereby obtain a corresponding original data signal;
 wherein said optical wireless receiver further comprises an over-sampling unit and a phase selector placed between said filter and said delay demodulator.

5. The system as claimed in claim 4, wherein said block code encoder reserves a plurality of codewords for controlling or transmitting messages.

6. The system as claimed in claim 5, wherein said codewords are used by said over-sampling unit and said phase selector to select correct sample phase to achieve digital data recovery.

* * * * *